United States Patent
De Ridder et al.

(10) Patent No.: US 11,741,496 B2
(45) Date of Patent: Aug. 29, 2023

(54) SOLUTION GRAPH FOR MANAGING CONTENT IN A MULTI-STAGE PROJECT

(71) Applicant: Sitecore Corporation A/S, Copenhagen (DK)

(72) Inventors: Tom De Ridder, Merchtem (BE); Tim Pashuysen, Dilbeek (BE); Frederic Fosselle, Londerzeel (BE)

(73) Assignee: SITECORE CORPORATION A/S, Copenhagen (DK)

( * ) Notice: Subject to any disclaimer, the term of this patent is extended or adjusted under 35 U.S.C. 154(b) by 10 days.

(21) Appl. No.: 16/728,128

(22) Filed: Dec. 27, 2019

(65) Prior Publication Data

US 2021/0201345 A1   Jul. 1, 2021

(51) Int. Cl.
| | |
|---|---|
| *G06Q 30/0242* | (2023.01) |
| *G06F 16/957* | (2019.01) |
| *G06Q 30/0204* | (2023.01) |
| *G06N 5/022* | (2023.01) |
| *G06Q 30/0201* | (2023.01) |

(52) U.S. Cl.
CPC ..... *G06Q 30/0244* (2013.01); *G06F 16/9577* (2019.01); *G06N 5/022* (2013.01); *G06Q 30/0201* (2013.01); *G06Q 30/0204* (2013.01); *G06Q 30/0243* (2013.01)

(58) Field of Classification Search
None
See application file for complete search history.

(56) References Cited

U.S. PATENT DOCUMENTS

| | | | | |
|---|---|---|---|---|
| 2006/0059461 | A1* | 3/2006 | Baker | G06F 8/20 717/113 |
| 2011/0249002 | A1* | 10/2011 | Duplessis | G06T 11/206 345/440 |
| 2012/0290938 | A1* | 11/2012 | Subbarao | H04L 67/22 715/738 |

(Continued)

FOREIGN PATENT DOCUMENTS

AU      2014277794 A1 *  1/2015

OTHER PUBLICATIONS

Lee-Kwang et al. ("The SSD graph: a tool for project scheduling and visualization," in IEEE Transactions on Engineering Management, vol. 35, No. 1, pp. 25-30, Feb. 1988, doi: 10.1109/17.6001) (Year: 1988).*

*Primary Examiner* — Christopher B Tokarczyk
(74) *Attorney, Agent, or Firm* — Gates & Cooper LLP

(57) ABSTRACT

A method and system provide the ability to manage entities of a marketing domain model in a multi-state workflow. Multiple entities are acquired in a content hub. Each entity is a set of data that belongs together as one and includes properties that describe entity details. Relations are created between the multiple entities to give meaning to the marketing domain model. A solution graph is generated that represents all of the multiple entities (nodes) and relations (edges). Inside the solution graph, a state workflow can be created for each node. Nodes can be linked to a state and there are transitions between the states. Multiple non-linear state workflows can be orchestrated by an overall waterfall-based workflow (that is linear and time duration based. A graphical user interface enables management of and renders a representation of the multiple entities, the solution graph, and the workflows.

20 Claims, 13 Drawing Sheets

(56) References Cited

U.S. PATENT DOCUMENTS

| | | | |
|---|---|---|---|
| 2014/0297740 A1* | 10/2014 | Narayanan | G06Q 10/10 709/204 |
| 2015/0127565 A1* | 5/2015 | Chevalier | G06Q 30/00 705/319 |
| 2017/0372043 A1* | 12/2017 | Hurst | G06F 16/9024 |

* cited by examiner

FIG. 7

SOLUTION GRAPH FOR MANAGING CONTENT IN A MULTI-STAGE PROJECT

CROSS-REFERENCE TO RELATED APPLICATIONS

This application is related to the following co-pending and commonly-assigned patent application, which application is incorporated by reference herein:

Provisional U.S. Patent Application Ser. No. 62/841,568, filed on May 1, 2019, with inventor(s) Tom De Ridder, Tim Pashuysen, Frederic Fosselle, and Gyula Mark Demeny, entitled "Marketing Content Hub User Experience";

Provisional U.S. Patent Application Ser. No. 62/841,573, filed on May 1, 2019, with inventor(s) Tom De Ridder, Tim Pashuysen, Frederic Fosselle, and Gyula Mark Demeny, entitled "Marketing Content Hub Cloud Development"; and Provisional U.S. Patent Application Ser. No. 62/841,576, filed on May 1, 2019, with inventor(s) Tom De Ridder, Tim Pashuysen, Frederic Fosselle, and Gyula Mark Demeny, entitled "Marketing Content Hub Content Marketing Platform (CMP)".

BACKGROUND OF THE INVENTION

1. Field of the Invention

The present invention relates generally to managing digital content, and in particular, to a method, apparatus, system, and article of manufacture for managing every aspect of marketing content across all marketing channels using a single, integrated solution.

2. Description of the Related Art

A content management system (CMS) is an application that is often used for the creation and modification of digital content. Traditional CMSs may provide for the creation and modification of the digital content with a content database or hub. However, prior art CMSs fail to provide a system that is adaptable to the changing needs of content lifecycle management, and in a manner that does not require the transformation and combination of data from multiple different systems (thereby resulting in delayed interpretation). Instead, prior art systems are inefficient and fail to provide a workflow system that is versatile and configurable in a multitude of ways.

SUMMARY OF THE INVENTION

Embodiments of the invention overcome the problems of the prior art by providing binaries, written content in all forms, different workflows (both agile and waterfall), intellectual property rights, analytics, and other entities in a single knowledge/solution graph. Nodes in the solution graph are entities and can have multiple properties. Entities are related to each other in multiple ways using relations (edges). The relations can have directions and cardinalities to steer knowledge inheritance (e.g., permissions of entities may be inherited over relations from parent to child). All entitles reside in a single graph that can be queried in real time. Further, the graph may be denormalized thereby enabling a full-text semantic search. In addition, embodiments of the invention include a hypermedia application programming interface (API) that automatically adapts to changes in the solution graph/graph definition and thereby enables various different methods of navigating and viewing the content/entities managed in a repository.

BRIEF DESCRIPTION OF THE DRAWINGS

Referring now to the drawings in which like reference numbers represent corresponding parts throughout:

FIG. 7 illustrates an exemplary table/list of campaign content displayed in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

System Overview

Embodiments of the invention provide a content hub systems with the ability to view and manage the properties, attributes, workflows, states, and lifecycle of digital content. In this regard, embodiments of the invention may provide for/include digital asset management (DAM), a content marketing platform (CMP), marketing resource management (MRM), and product content management (PCM). Through these components (i.e., the DAM, CMP, MRM, and PCM), a content hub system of embodiments of the invention provide a versatile view of a user's content landscape with a single location for all digital assets, media, products, and other content. In addition, the components enable the ability to capitalize on personalization and management of the content that feeds the system (i.e., the personalization), artificial intelligence (AI) and machine learning (ML) for content tagging, integration within a CMS and commerce solutions, and the ability to plan, schedule, and organize content production via a structured process with multiple different types of workflows.

Further to the above, embodiments of the invention utilize a knowledge graph (also referred to as a solution graph) that enables the ability to view and manage content (in all forms) throughout the content lifecycle using different workflows (both agile and waterfall), while also managing intellectual property rights for the content, performing and maintaining analytics, etc.

Knowledge Graph

Overview

In contrast to prior art solutions, in embodiments of the invention, the binaries, the written content in all forms, the different workflows (both agile and waterfall), the intellectual property rights, the analytics, and any other thing/type/piece of content are maintained, managed, viewed, etc. in a single knowledge graph.

Figure 1:
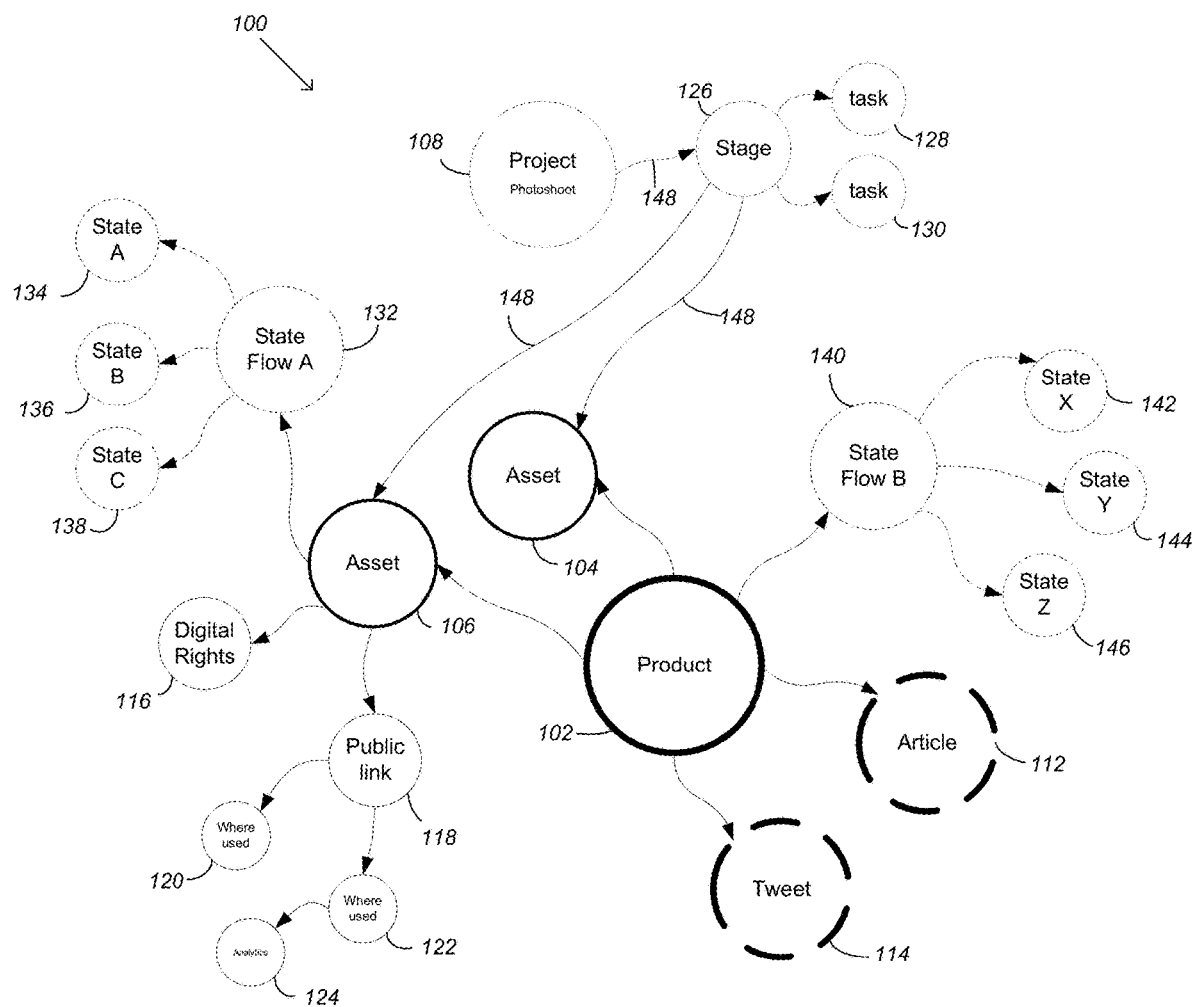
FIG. 1 illustrates an exemplary knowledge graph that may be generated in accordance with one or more embodiments of the invention.

FIG. 1 illustrates an exemplary knowledge graph that may be generated in accordance with one or more embodiments of the invention. The solution/knowledge graph 100 provides a model for every piece of content/thing (e.g., that may be maintained within a content hub). Every node in the graph 100 is semantically rich by its context and position in the graph 100. Such a graph 100 not only exposes real-time insights and visualizations without the need to transform and combine data from different systems for delayed interpretation, but also is extremely adaptable to answer to the ever-changing needs of content lifecycle management.

All nodes in the graph 100 are "entities" and can have multiple properties. In this regard, each node represents a thing/entity. As used herein, an entity is a set of data that belongs together as one (e.g., a product, a campaign, a project, a story, a recipe, a file, etc.). In other words, an entity is anything that can be found and displayed as a result when searching for content. An entity is made up of properties that describe the entity details (e.g., product number, benefit, campaign brief, file size, etc.). Properties may be available in multiple data-types (e.g., text, number, option list, Boolean [yes/no], date, etc.). As many properties can be defined on an entity as are needed. Relations between entities may give meaning to a marketing domain model. By creating relations between entities, one makes each of the entities more defined and richer without duplicating data (e.g., a product can have multiple variants and each of them can have a pack shot; a recipe can use multiple products; a campaign can contain a story and some associated files, etc.). Relations enable search engines to be smarter and provide the necessary context when browsing through content, allowing users (e.g., marketers) to find their content quickly and easily.

Accordingly, a product 102, an asset 104-106, and a project 108 are all entities represented by the reflective nodes. Multiple entities are created in graph 100 and there can be multiple properties/attributes per entity/thing. For example, as described above, a product 102 can have a product number or description (e.g., article 112 or tweet 114), an asset 104/106 can have a file size, file name, digital rights 116, and/or can be exposed as a public link 118 to information about the asset 106 (e.g., where the asset was used 120/122), and properties about the information such as analytics (124). Similarly, a project 108 may have different stages 126 consisting of various tasks 128/130 (and or may have different goals/briefs [not illustrated]).

In addition, the different entities may have different states/state flows. For example, asset 106 may have state flow A 132 which may consist of states A 134, b 136, and C 138. Similarly, product 102 may have state flow B 140 that consists of state X 142, Y 144, and Z 146. The different types of states and state flows are described in further detail below.

The different entities/nodes 102-146 can be related to each other in multiple ways using relations (edges) (represented by lines 148 in graph 100—also referred to herein as relations 148). In this regard, unlike a typical folder structure, in embodiments of the invention, the graph 100 enables multiple relations 148. Further, relations 148 can have directions and cardinalities to steer knowledge inheritance. In this regard, the relations 148 may provide for both one-to-many AND many-to-one relations, providing more freedom than a typical folder structure. As illustrated, all of the entities 102-146 may reside in the single graph 100 (i.e., with all nodes 102-146 connected via relations 148).

Further to the above, the relations 148 define the knowledge inheritance between nodes 102-146. In other words, the relations 148 (and the direction/cardinality) define parent-child relationships in the graph 100. For example, the relation 148 from tweet 114 to product 102 (i.e., the arrow points towards tweet 114) establishes that the tweet 114 is a child of product 102. The knowledge inheritance provides that all of the data of the product 102 is inherited by the tweet 114 (but not vice versa). In this regard, the tweet 114 is knowledgeable about the product 102 but not the other way around. For example, if one searches for product data on any tweets 114, the linked tweets will show (if found). However, if one searches for tweet data on any product 102, as the product/parent 102 does not inherit the data of the tweet/child 114, no products will be found.

Further to the above, a specific example of the types of properties that can be inherited include that of permissions of entities 102-146. In this regards, permissions of entities 102-146 can be inherited over relations 148 to children (i.e., from parent-to-child). As an example, if access to a product 102 is secure and limited to a select group of users, the relation to a child (e.g., tweet 114) can be defined such that the permissions from the parent (i.e., product 102) can be inherited. In this manner, each individual entity 102-146 does not need to have separate security defined. Instead, the security permissions can simply be inherited form the parent entity.

The graph 100 may also be queried in real-time. For example, one can query for a digital rights contract 116 and product data 102 can be used as part of the query. When searching the graph 100, the edges/relations 148 are used to reach the desired node 102-146 and every parent/child can be queried using the edges/relations 148 to hop from one node 102-146 to another node 102-146.

Graph 100 may also be denormalized to enable a full-text semantic search. In this regard, if one desires to search at scale in real-time, endless hopping from node 102-146 to node 102-146 via relations 148 is inefficient, computationally expensive (i.e., to traverse the graph), and not scalable (i.e., to thousands or tens of thousands of users). By denormalizing the graph 100, the search can be conducted in a distributed manner. For example, embodiments of the invention may denormalize the graph 100 into a flat, distributed search index where all parent-child relations are projected to the lowest level with depth stored as a denormalized entity inside of the flat, distributed search index. In this regard, one (or thousands of users) may search across all entities (without using the graph 100).

Further to the above, embodiments of the invention may provide a hypermedia application programming interface (API) that automatically adapts to changes in the definition of graph 100. In this regard, every entity 102-146 has an API reference and may be viewed as a hypermedia API (see further description below). The hypermedia API provides a different user interface tool allowing a user to activate hyperlinks to view different entities 102-146 based on the relations. Further, as the graph 100 is updated, the hypermedia API is simultaneously and automatically updated (e.g., without additional user input) and vice versa.

Figure 2:
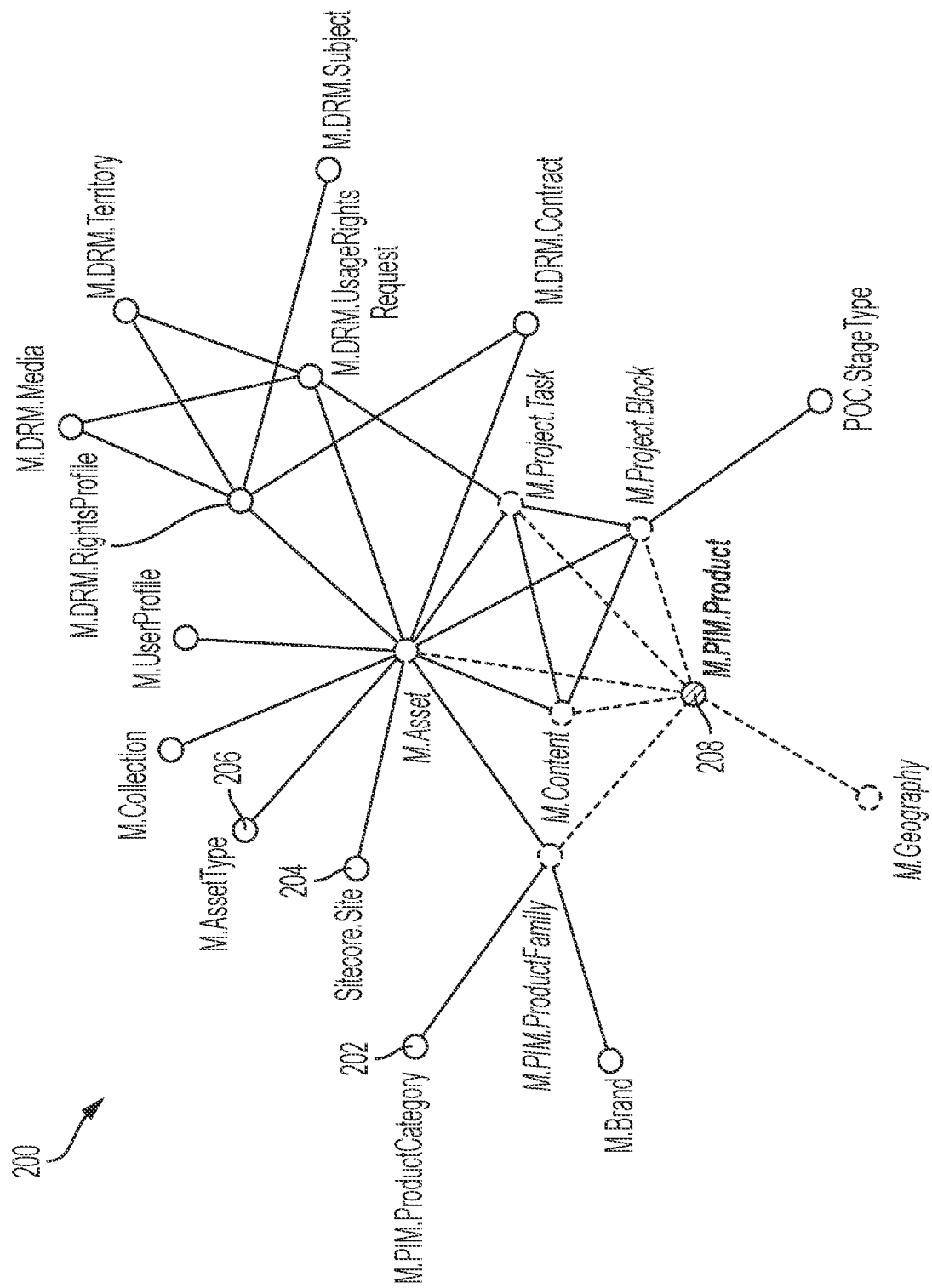
FIG. 2 illustrates a screen shot of an exemplary graph/schema in accordance with one or more embodiments of the invention.

FIG. 2 illustrates a screen shot of an exemplary graph 200 (also referred to as a schema) in accordance with one or more embodiments of the invention. The graph 200 includes different entities/nodes 202-208) with relations connecting them.

Details

The data in the content hub that is modeled using the knowledge graph 100/200 consists of content types (represented as nodes 102-146) known as entities, such as: assets 104, products 102, or projects 108. The graph 100/200 is defined from the properties and relations 148 that are created through member groups. An entity definition consists of one or many member groups. Each member consists of the type of the member, a definition of the property, the relationship between entities and the taxonomy.

Referring to FIG. 1, an exemplary member group is that for project 108 which includes members stage 126, and tasks 128-130. Other member groups include State Flow A 132 (and properties State A 134, State B 136, and State C 138), and State Flow B 140 (and properties State X 142, State Y 144, and State Z 146).

As described above, the entity model is represented as a directed graph 100/200, allowing use of various forms of inheritance. The graph 1002/00 is built on this principle to deliver expected effects. The basic types of inheritance include: taxonomy inheritance (the entity has a taxonomy hierarchy attached to it and can be searched for using this taxonomy [faceting]); path inheritance (the full path is available on path enabled entities); topology inheritance (the entity inherits directly from its parents); content inheritance (the entity inherits the full-text content of its ancestors); completion inheritance (the entity has the completion content of its ancestors); and security inheritance (the entity inherits security from its ancestors which defines the entity access).

Such a model creates numerous possible configurations. Examples include:

Entity content, which should be included in the full-text search has been changed. This change will require an update of the entity itself as well as any descendant with content inheritance.

Entity has been locked, as this information is not part of any inheritance, only the relations of this particular entity need to be updated.

Entity was removed from the system. Therefore any descendants connected via relations/inheritance need to be updated.

The basic principle is that any change to the entity or the relation's information, which is visible to the entity or to a descendant of the entity via inheritance, needs to be fully propagated (e.g., to the entity's children) so that none of the related entities in the system contain outdated information. The previous concept of the inheritance creates a natural order in the entities (e.g. parents, children, grandchildren) as well as a natural order in the entity definitions (e.g. there is data flow from asset definition entities to file definition entities but not the other way around). This concept is an order of dependency, representing dependencies of several objects towards each other. There are entities and entity definitions with less dependencies (high hierarchy entities) and those with a more dependencies (low hierarchy entities).

Embodiments of the invention provide for various operations to be performed on the graph 100/200 (e.g., via a graph server). For example, an index worker is responsible for the creation of denormalized search service documents, making it active after any change to the entity's data model. Further, a business audit graph worker may be responsible for creating audit entries from any event in the system, including those not affecting the entity's data model.

Any change in the system translates to the following succession of events in the graph server:

(1) If the event describes a change to the entity data model, the graph model is updated;

(2) If the graph model is updated, any graph worker listening to the graph changes is notified to apply all the effects of the event (e.g. index worker exports all affected entity-bound search service documents).

(3) If the graph model is intact because the event did not change the entity data model, any graph worker listening to such non-modifying (meta) events are notified to perform specific actions (e.g. Business audit graph worker creates an audit entry while using existing graph data to compose rich context information).

The following events do not modify the graph model in any way:

Validation changes of the entity definition.

Representation changes of the entity definition.

Events not related to direct changes or deletion of entities, entity definitions and data sources.

The following events reload the graph model:

Content entity definition changes affecting descendants will reload all the entities of the corresponding entity definition as well as all the entities of the dependent entity definitions.

Content entity definition changes not affecting descendants will reload all the entities of the corresponding entity definition as well as all the entities of the directly dependent entity definitions (e.g. children).

Entity changes will reload the corresponding entity any descendant entity which inherits any information from this entity according to the principle mentioned above.

Exemplary Application/Graphical User Interface

Embodiments of the invention model the data in the content hub using the knowledge graph 100 as described above. Based on such a model an application can perform searches and access the data represented by the nodes/entities in an efficient timely manner without requiring the transformation and combination of data from multiple different systems. This section provides an exemplary application that can be used to display/access/modify the data in the content hub via/based on the graph 100.

Product Details

Figure 3:
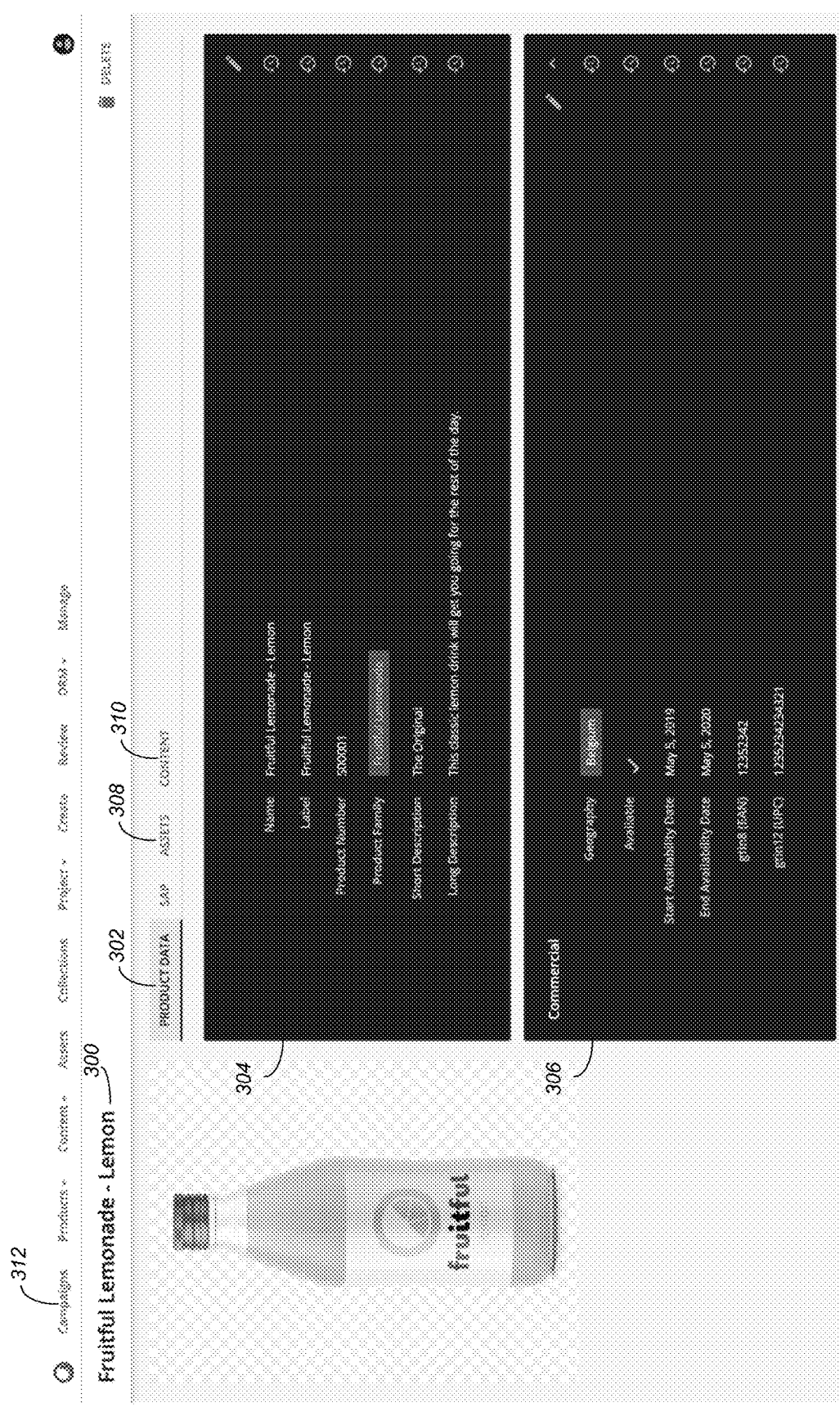
FIG. 3 illustrates an exemplary product page in accordance with one or more embodiments of the invention.

The various entities/assets maintained in a content hub may be managed via a graphical user interface in which navigation, display, and editing capabilities are based on the graph 100. FIG. 3 illustrates an exemplary product page for the "Fruitful Lemonade-Lemon" product 300 (represented in FIG. 1 as product 102). The product data tab 302 includes general information 304 for the product 300 including the product name, label, number, family, short description and long description. Commercial information 306 for the product 300 also indicates the geography/country, whether it is available, the date range for availability, and EAN and UPC numbers.

Figure 4:
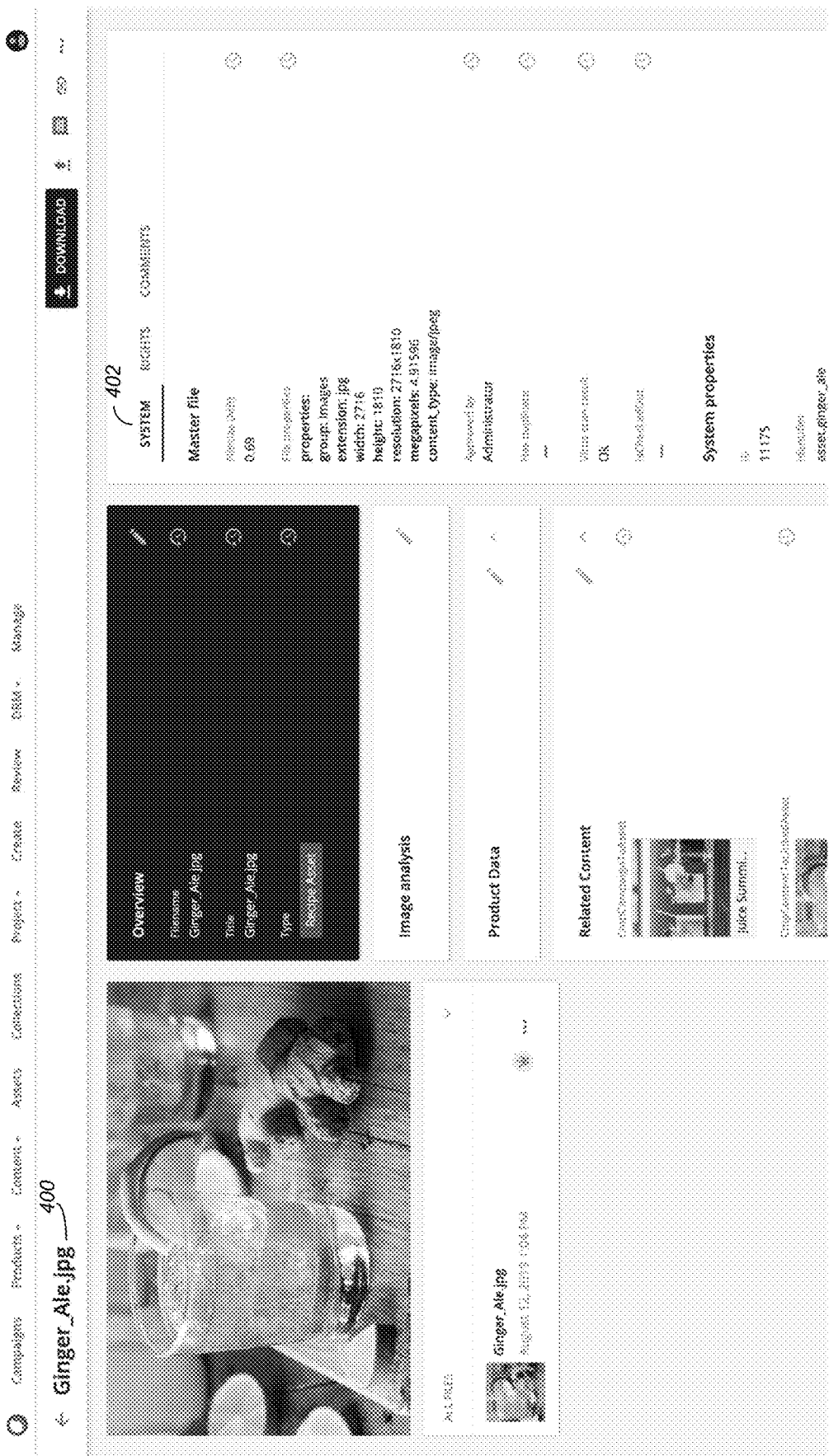
FIG. 4 illustrates an exemplary asset detail user interface page that may be displayed in accordance with one or more embodiments of the invention.

Referring to FIGS. 1 and 3, to view the linked assets 104-106 for the Fruitful Lemonade-Lemon product 300, the user can click on the asset tab 308 which displays a list of the assets 104-106 that are available for selection. One can follow relations (e.g., hyperlinks) for each listed asset 104-106 to view additional details about such assets 104-106. FIG. 4 illustrates an exemplary asset detail user interface page that may be displayed in accordance with one or more embodiments of the invention. Asset details include system information 402 such as information about the file for that asset 400 including file size, properties, etc. Different relations can be selected to navigate back to the asset listing page and/or to view the product 300 related to the asset 400 as desired.

Content Details

Figure 5:
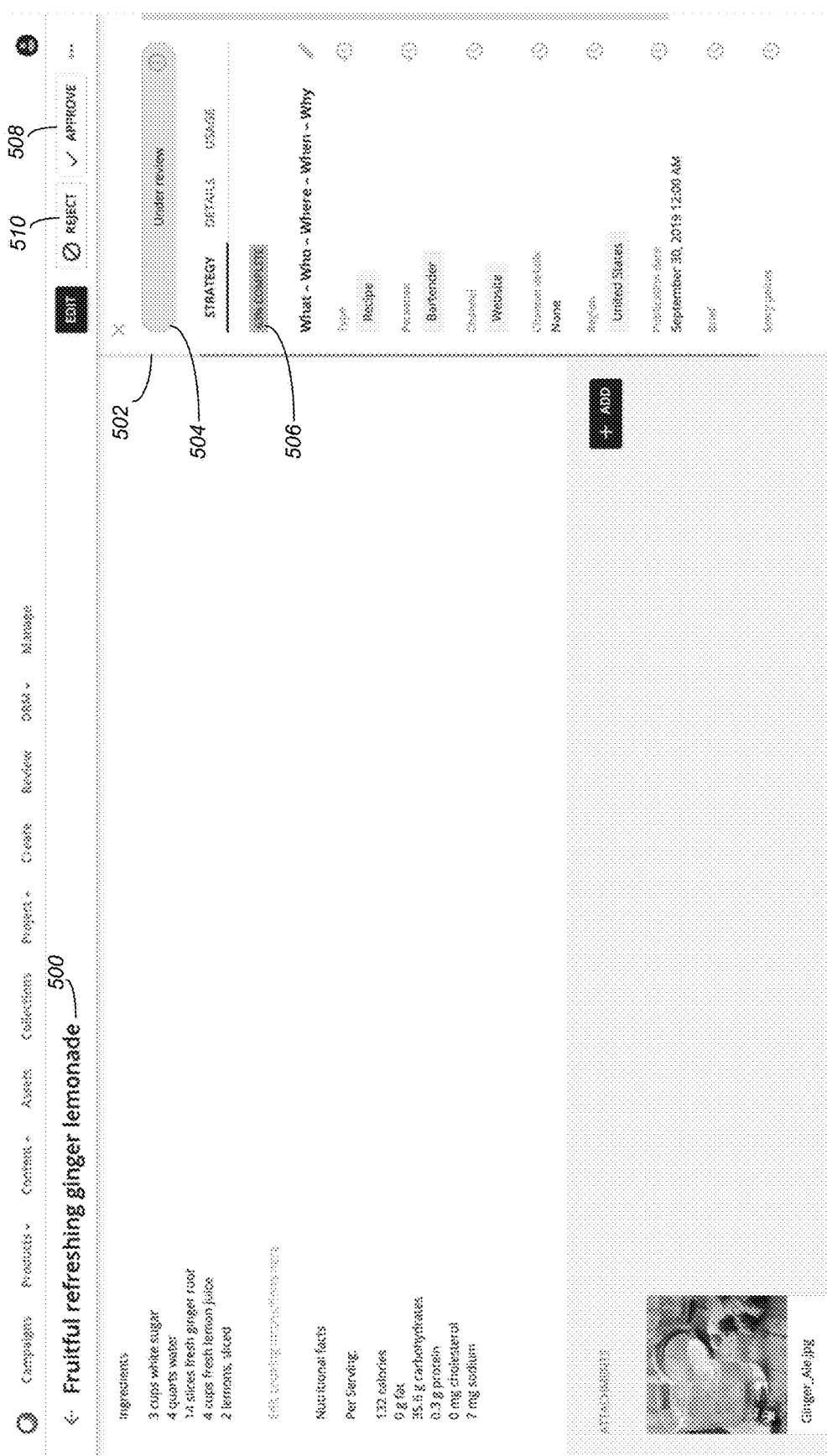
FIG. 5 illustrates an exemplary content detail user interface page in accordance with one or more embodiments of the invention.

Returning back to FIG. 3, a user can click on the content tab 310 to view content that has been created or is associated with the product 300. FIG. 5 illustrates an exemplary content detail user interface page in accordance with one or more embodiments of the invention. The content 500 in FIG. 5 is for the fruitful refreshing ginger lemonade ingredients, nutritional facts, etc. In addition, the current status of the content within a project is displayed in area 502. As illustrated, content 500 is currently under review 504 and the content is 63% completed 506. The user has the option of inputting additional information about the content 500 (e.g., the what, who, where, when, and why information). The content 500 for any particular product 300 may include blog posts, articles 112, tweets 114, advertisements, emails, recipes, social media messages, webinars, white papers, etc. To transition the content 500 to the next stage, the user may select the "approve" option 508 (or may reject the content 510) as desired.

Campaign Details

All of the different entities (i.e., product 102, assets 104-106, and content 112-114) can be tied together into a campaign. Campaigns are structured groups that tie together/use content/entities in a particular manner (e.g., as part of a particular strategy/theme). For example, a campaign may include a grouping for launching a particular brand, a time period (e.g., Summer 2019), a theme such as powerful social media, a product launch (e.g., Fruitful Launch 2019), etc. A particular campaign can be selected (from a list of campaigns) by navigating to the campaigns tab 312. Once selected, detailed information for a campaign may be displayed.

Figure 6:
FIG. 6 illustrates an exemplary campaign detail user interface page in accordance with one or more embodiments of the invention.

FIG. 6 illustrates an exemplary campaign detail user interface page in accordance with one or more embodiments of the invention. The overview 602 for the Juice Summit 2020 campaign 600 includes general information 604 such as the starting and ending dates of the campaign, the team for the campaign, and the type of campaign (e.g., event). The total engagement value 606 and engagement value per channel 608 (e.g., channels including facebook note, facebook, twitter, website, email, etc.). The overview 602 may also include return on investment information 610 such as the virtual engagement revenue, the total cost for the campaign, and the return on investment (e.g., based on the difference between the revenue and cost).

Figure 7:
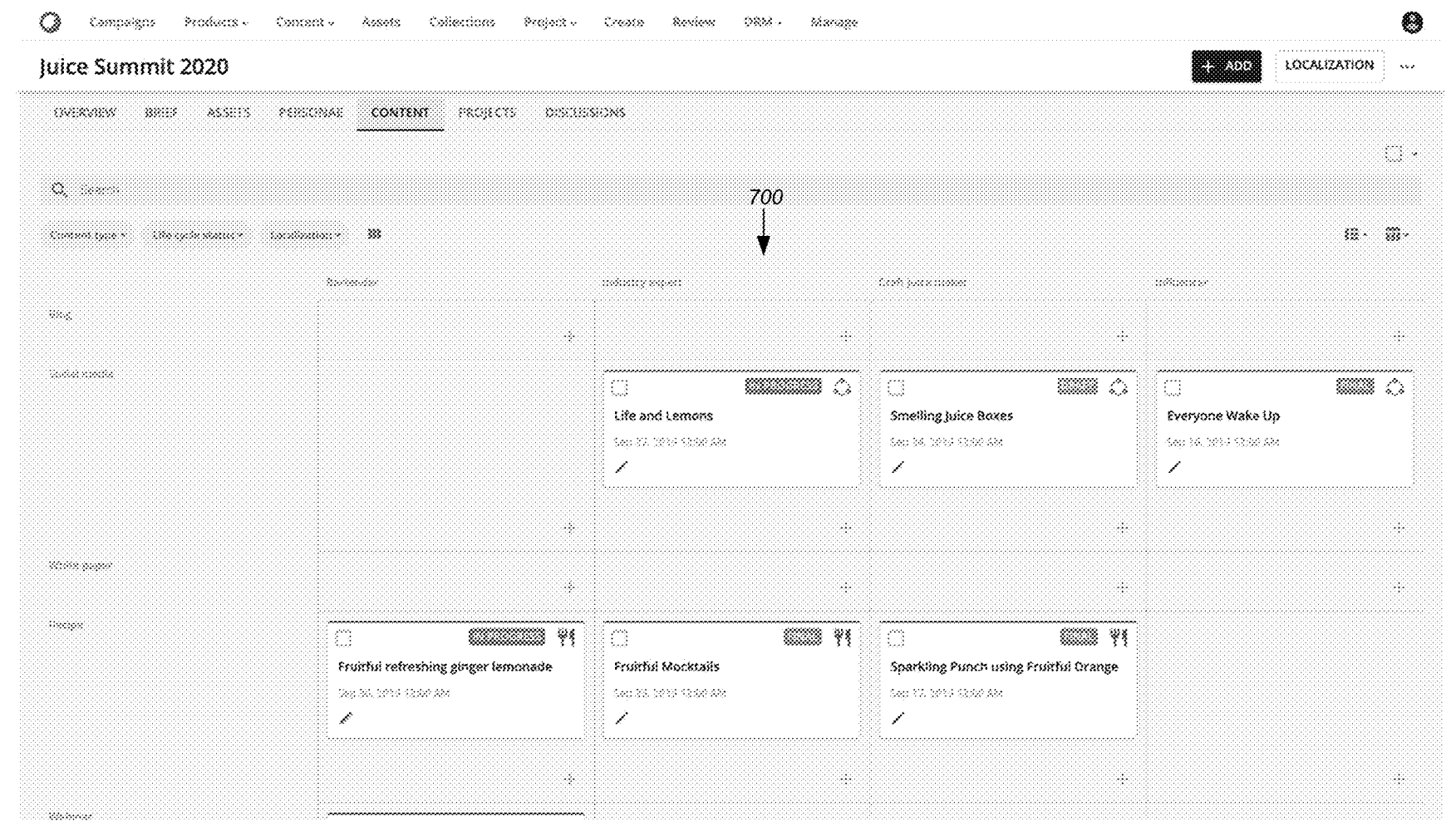

Upon selecting on the content tab 612 for a campaign, a table/list of the different content in that campaign are displayed. FIG. 7 illustrates an exemplary table/list of campaign content displayed in accordance with one or more embodiments of the invention. The content displayed in table 700 is the same content described above but organized in a table sorted by different types of consumers in columns. In FIG. 7, the different consumers are bartender, industry expert, craft juice maker, and influencer. The rows represent the different types of content including blog, social media, white paper, and recipe. The table enables the user to determine which items are missing for which consumers in particular categories. As illustrated, various recipes are used by the bartender, industry expert and craft juice maker but not the influencer. Similarly, this campaign does not have any blog posts or white papers for any consumers, but has social media content for the industry expert, craft juice maker and influencer.

Projects

Returning to FIG. 1, the entities/assets 102-106 can all be driven via projects 108 such that the users can collaborate in an effective manner. In this regard, an MRM system may provide four hierarchical components-multi-stage projects, basic projects, tasks 128-130, and jobs. A basic project is a coordinated set of tasks, allowing user collaboration over the project's content. Basic projects are used for a simple workflow, enabling easy collaboration and simple task assignments. A multi-stage project is a coordinated set of stages 126 that allows users to achieve specific marketing objectives. An example of a multi-stage project is a marketing product launch. Typically, users may want to articulate workstreams, stages or milestones within the overall multi-stage project. In each workstream (advertising, logo design, packaging, brochures, social media content, etc.), the user needs to use any possible marketing tools and resources to deliver great product value.

A multi-stage project can be divided into multiple stages 126 and can consist of a combination of stages and milestones. Stages 126 can be organized in a hierarchical way to reflect the sequence of the dependencies. Stages 126 are larger pieces of the process, that typically span over one or more days. An example of stage could be: develop the briefing, execute a photo-shoot, video post production. A timeline may be displayed on a multi-stage project detail page and provides a place where stages and their relation can be configured and visualized. Through the sequence of stages and their statuses, a project manager is able to easily monitor and keep track of the work in progress.

Milestones are significant points on the timeline within a multi-stage project, used to determine the progress of the global project towards its end goal. Ideally, milestones should be logically tied to the related scheduled stages. Milestones may be seen as special cases of stages. While stages have a defined list of things happening, a duration, and deliverables, a milestone is merely a placeholder that helps to articulate the multi-stage project's progress.

Project templates may be used to provide a defined set of multi-stage project structures or a sequence of multiple projects that can be used for similar recurring multi-stage projects.

Within a basic or a multi-stage project context, collaboration can either be free or be managed by the project manager by assigning tasks to team members. Tasks 128-130 are granular in nature and typically range from a few minutes to a few days of work. Examples of tasks 128-130 could be: making a selection from the images from a photo-shoot, making a change to a layout, reviewing and approving a piece of artwork, etc. In addition to the project-management-driven approach, users may also add automated tasks that are typically set up at the beginning of a basic project, a stage, or as part of a project template. Task-chaining allows the automatic start of a task depending on other factors, the transfer of content between tasks, and many other features.

A job is a single space in which predefined teams and departments can collaborate over specific content independently, with a focus on their own responsibilities. Finite state flows may be enabled for any type of content, enabling users to design digital logics within the content creation process. In other words, a user can define a finite number of states, transitions, and actions. The state flow stores the status of any content at any given time. The transition logic between states is facilitated by a dynamic and flexible user interface. States can be interpreted as a step in the life cycle of an object/entity. Transitions depicts a potential movement from one state to another and each transition may have a descriptive label that explains the event triggering a certain transition. Actions are operations that are performed at state transitions and/or within a state.

Figure 8:
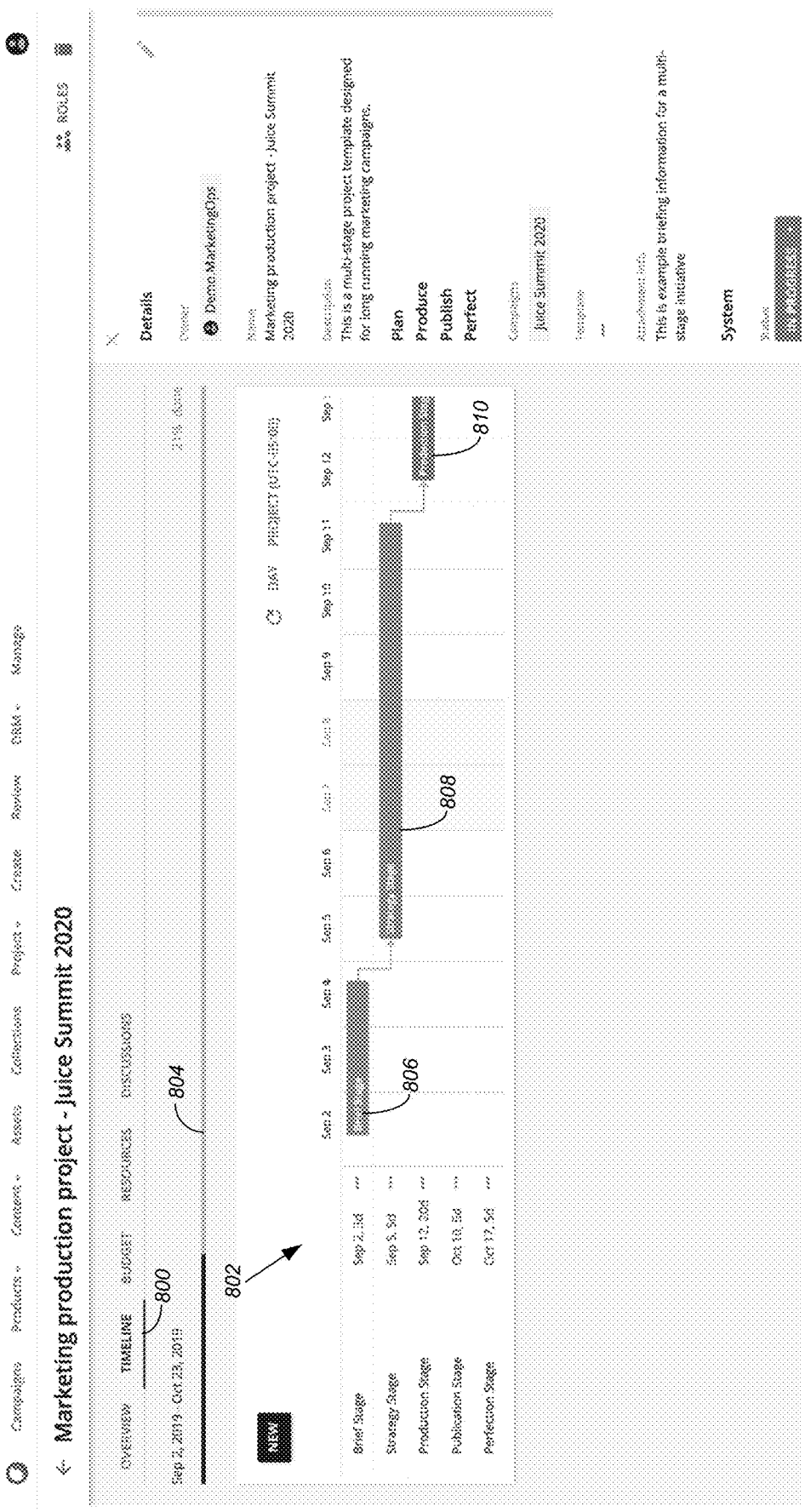
FIG. 8 illustrates an exemplary timeline project detail graphical user interface in accordance with one or more embodiments of the invention.

As described above, within multi-stage projects, a timeline may be used to detail the different stages. FIG. 8 illustrates an exemplary timeline project detail graphical user interface in accordance with one or more embodiments of the invention. The timeline interface 800 displays a Gantt chart 802 that summarizes the whole multi-stage project in a calendar layout. A Gantt chart, commonly used in project management, is a mechanism to show activities/stages (including tasks or events) displayed against time. In the exemplary implementation, on the left of the chart 802 is a list of the stages, and along the top is a suitable time scale. Each stage is represented by a bar, the position and length of the bar reflects the start date, duration, and end date of the stage. The progress bar 804 at the top shows the progress of the multi-stage project based on stage completion (e.g., 21% in the progress bar 804).

The Gantt chart 802 allows dependencies between stages. A stage may have multiple preceding stages and multiple succeeding stages. A predecessor is another stage that needs to be completed before the succeeding stage can initiate (e.g., the outcome of a photo-shoot is needed before the photos can be used in a print layout). The statuses of a stage may progress from not started, to in progress, to complete. As illustrated in FIG. 8, the Gantt chart 802 illustrates a waterfall type workflow with dependencies between stages starting from brief stage 806 to strategy stage 808 to production stage 810, etc. (i.e., brief stage 806 must be completed before strategy stage 808 starts, which must be completed before production stage 810 starts). As illustrated, brief stage 806 and strategy stage 810 are completed and production stage 810 is in progress.

Figure 9:
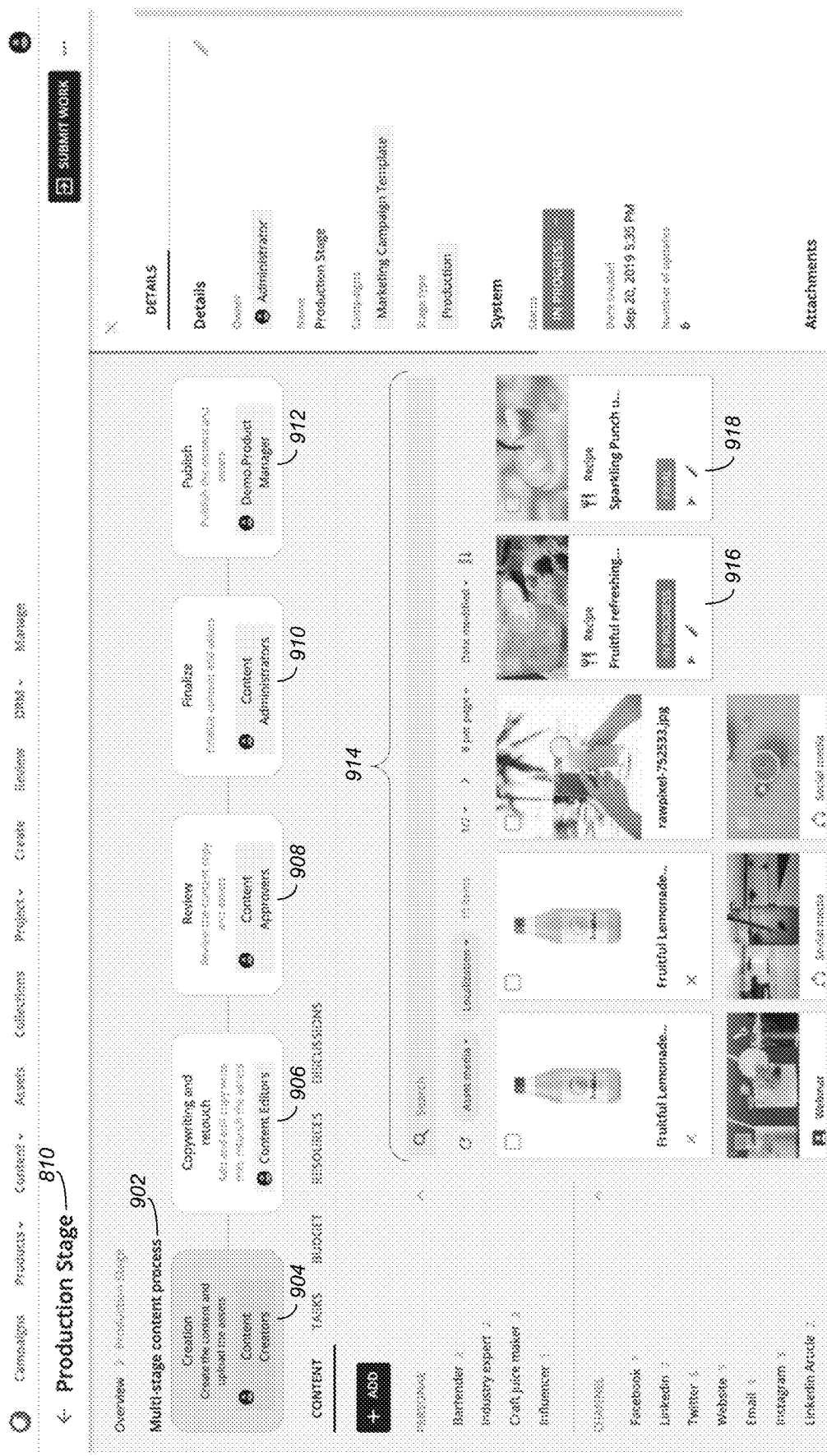
FIG. 9 illustrates the stage details graphical user interface for a production stage in accordance with one or more embodiments of the invention.

Users may navigate to the details for each stage 806-810 by selecting a particular stage 806-810. For example, FIG. 9 illustrates the stage details graphical user interface for production stage 810 in accordance with one or more embodiments of the invention. The multiple stage process 902 (also referred to as a state machine workflow 902) for the production stage 810 consists of the creation 904, copyright and retouch 906, review 908, finalize 910, and publish 912 stages/states. The different states of the state machine workflow 902 are represented in FIG. 8 as state flow A 132 (with states A, B, and C 134-138) and state flow B 140 (with states X, Y, and Z 142-146).

Figure 10:
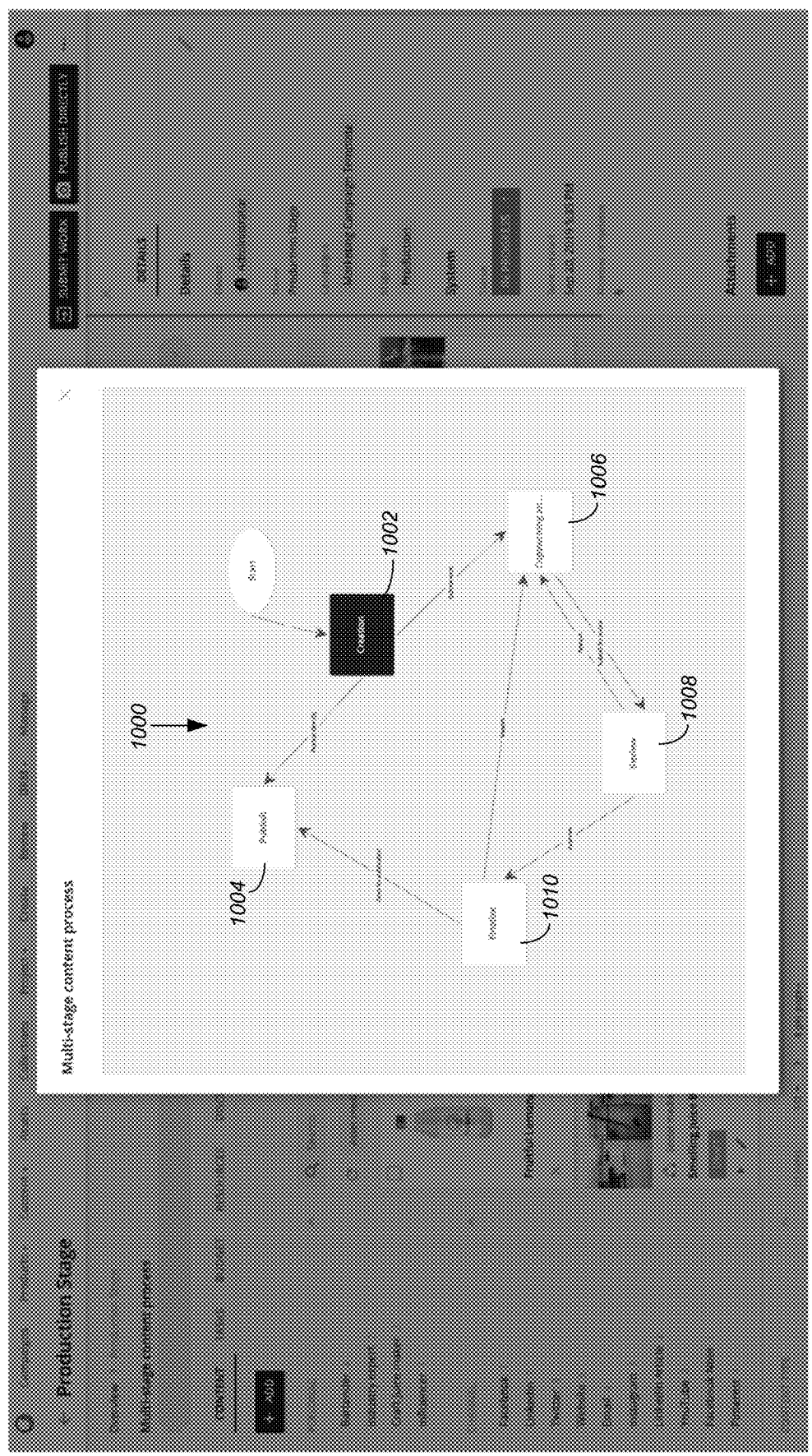
FIG. 10 illustrates an exemplary state machine flow graphical user interface for a multi-stage content process in accordance with one or more embodiments of the invention.

Although illustrated in a linear manner, the stages/states 904-912 of the state machine workflow 902 may not be linear and one may jump/navigate between states (e.g., from state 904 to 910 and vice versa). In this regard, while there are multiple state flows that may be utilized, they are all managed/orchestrated within a project 108. When a state flow is non-linear, the linear display in FIG. 9 may not be displayed and may be replaced with an option to display a graph depicting the state flow process and transitions. For example, FIG. 10 illustrates an exemplary state machine flow graphical user interface for a multi-stage content process in accordance with one or more embodiments of the invention. Such a state machine flow 1000 is agile (i.e., non-linear) and is not a structured waterfall timeline flow such as that illustrated in FIG. 8. The transitions between states 1002-1010 are illustrated and depicted by the arrows and contain a descriptive label/text describing the event/act/task/job that enables/causes/triggers the transition. In this regard, work is submitted to transition from the creation state 10002 to the copywriting state 1006, which may then transition to the review state 1008 by submitting for review. Further, content may be published directly to transition from the creation state 1002 to the publish state 1004.

Different content may be linked to each stage/state 904-912. As illustrated, the creation stage/state 904 has been selected and the content 914 linked thereto is displayed. Each item of content 914 may also have a state associated therewith. For example, recipe 916 is in progress and recipe 918 is in the final state.

In view of the above, as one navigates/clicks on a stage 806-810 in the waterfall timeline of FIG. 8, embodiments of the system unwind and provide the state flows 902 for the selected stage 806-810 and further hyperlink navigation enables the user to view/edit the different states/stages 904-912 within the selected stage 806-810. Users can manage the state transition process by naming a state, selecting the succeeding state, and saving/storing the transition. Further, embodiments of the invention enable multiple transitions from a single stage/state 904-912.

Further to the above, embodiments of the invention provide a planning engine with a waterfall timeline workflow that has linked content that provides an agile state workflow that is configurable. Such capabilities enables the planning of workflows in linear as well as non-linear manner such that non-linear flows may be rolled-up/packaged into an waterfall stage that has a defined duration. In this regard, embodiments of the invention enable the ability to provide a design that progresses from a waterfall timeline workflow into an agile non-linear workflow when work items/tasks are smaller (i.e., multiple non-linear agile state workflows can be orchestrated by an overall waterfall-based workflow).

In addition, the ability to use both linear waterfall and non-linear agile workflows may be used across all of the different concepts/systems including the MRM, CMP, and DAM in a manner that is supported by the solution graph.

Logical Flow

Figure 11:
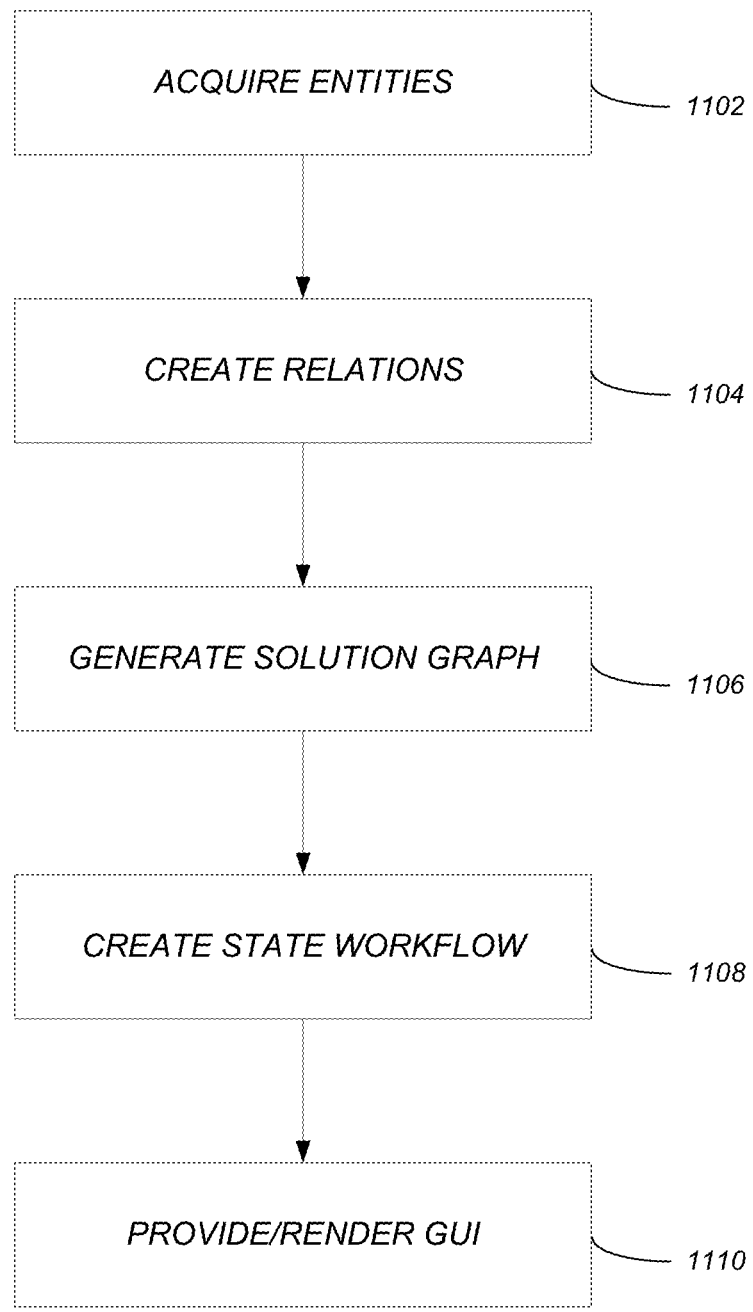
FIG. 11 illustrates the logical flow for managing entities of a marketing domain model in a multi-state workflow in accordance with one or more embodiments of the invention.

FIG. 11 illustrates the logical flow for managing entities of a marketing domain model in a multi-state workflow in accordance with one or more embodiments of the invention.

At step 1102, multiple entities of the marketing domain model are acquired in/into a content hub. Each entity of the multiple entities is a set of data that belongs together as one. Further, each entity has one or more properties that describe entity details.

At step 1104, relations between the multiple entities are created to give meaning to the marketing domain model. Each of the relations has a direction and cardinality that steers knowledge inheritance. As part of the knowledge inheritance, permissions of the multiple entities may be inherited over relations from a parent entity to a child entity.

At step 1106, a solution graph is generated that represents all of the multiple entities and relations. Each node of the solution graph represents one of the multiple entities. Edges connecting the nodes in the solution graph represent the relations.

At step 1108, inside the solution graph, a state workflow is created (for one or more of the nodes). The state workflow has one or more states, and one or more transitions between the one or more states. In addition, the state workflow includes both a waterfall-based workflow and an agile state workflow. The waterfall-based workflow includes one or more waterfall-based states (of the one or more states) that are linear and time duration based. In addition, all of the waterfall-based states are either depended on or dependent on another waterfall-based state. The agile state workflow (or multiple non-linear state workflows) is a non-linear state workflow that is orchestrated by an (overall) waterfall-based workflow.

At step 1110, as the multiple entities progress through the state workflow, a graphical user interface is provided that enables management of and renders a representation of the multiple entities, the solution graph, and the state workflow. Part of the graphical user interface provides the ability query the solution graph in real time (which is enabled y the solution graph). In addition, the solution graph may be denormalized thereby enabling the system/method to conduct a full-text semantic search (on the denormalized solution graph). The graphical user interface may also include a hypermedia application programming interface (API) that automatically adapts to changes in the solution graph (e.g., code/pseudo code may be generated and displayed in a manner that allows navigation via hyperlinks embedded into the different entities such as products, assets, projects, etc.

The graphical user interface may further enable and provide management capabilities and access to the multiple entities across multiple systems. Such multiple system may include a digital asset management (DAM) system, a content marketing platform (CMP) system, and a marketing resource management (MRM) system (i.e., based on the structure and system, the solution graph and state workflow can be used across multiple systems including a DAM, CMP, and MRM).

With respect to the DAM, the entities and relations may be stored in a marketing production repository of the DAM. The marketing production repository aggregates and stores product data (e.g., key data, descriptions, benefits, translations, etc.), campaign data (e.g., channels, launch dates, analytics, etc.), user data (e.g., agencies, photographers, marketing professionals, etc.), files (e.g., creative assets, videos, documents, etc.), and file metadata (or any other definition) used in daily marketing business. Further, management and access to the marketing production repository is provided via the solution graph and state workflow for the daily marketing business. Such capabilities enable users to structure and restructure both existing and new content in a logical way.

With respect to the CMP, embodiments of the invention provide for utilizing, within the CMP, the solution graph and state workflow to plan, author, collaborate, curate, and distribute different entity types that drive execution of a content marketing strategy, while managing a campaign as part of the marketing strategy. Such a system enables the capability to consistently create relevant and valuable content that is integrated into an overall marketing strategy including the integration of editing, collaboration, and approval tools.

With respect to the MRM, embodiments of the invention provide processes for the multiple entities including creating new entities, localizing the multiple entities, and reusing entities, as well as enabling collaboration with respect to the multiple entities (e.g., creating product copy and USPs, collaboration with translation agencies, photo-shoots, layouts, video, interactive, etc.). Thus, the solution graph and state workflow enable a 360 degree view of all a user's marketing content and processes.

Hardware Environment

Figure 12:
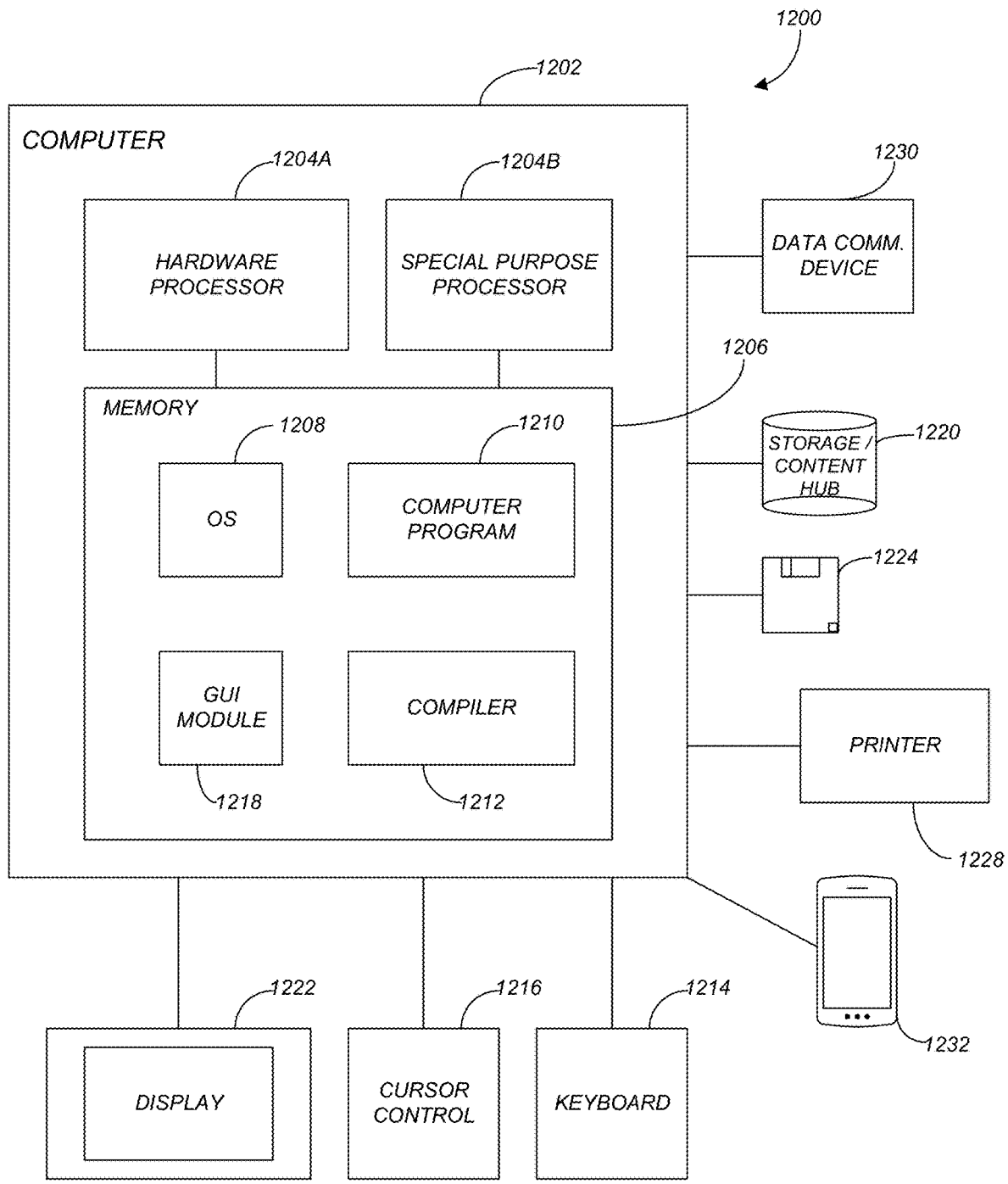
FIG. 12 is an exemplary hardware and software environment used to implement one or more embodiments of the invention.

FIG. 12 is an exemplary hardware and software environment 1200 (referred to as a computer-implemented system and/or computer-implemented method) used to implement one or more embodiments of the invention. The hardware and software environment includes a computer 1202 and may include peripherals. Computer 1202 may be a user/client computer, server computer, or may be a database computer. The computer 1202 comprises a hardware processor 1204A and/or a special purpose hardware processor 1204B (hereinafter alternatively collectively referred to as processor 1204) and a memory 1206, such as random access memory (RAM). The computer 1202 may be coupled to, and/or integrated with, other devices, including input/output (I/O) devices such as a keyboard 1214, a cursor control device 1216 (e.g., a mouse, a pointing device, pen and tablet, touch screen, multi-touch device, etc.) and a printer 1228. In one or more embodiments, computer 1202 may be coupled to, or may comprise, a portable or media viewing/listening device 1232 (e.g., an MP3 player, IPOD, NOOK, portable digital video player, cellular device, personal digital assistant, etc.). In yet another embodiment, the computer 1202 may comprise a multi-touch device, mobile phone, gaming system, internet enabled television, television set top box, or other internet enabled device executing on various platforms and operating systems.

In one embodiment, the computer 1202 operates by the hardware processor 1204A performing instructions defined by the computer program 1210 (e.g., a computer-aided design [CAD] application) under control of an operating system 1208. The computer program 1210 and/or the operating system 1208 may be stored in the memory 1206 and may interface with the user and/or other devices to accept input and commands and, based on such input and commands and the instructions defined by the computer program 1210 and operating system 1208, to provide output and results.

Output/results may be presented on the display 1222 or provided to another device for presentation or further processing or action. In one embodiment, the display 1222 comprises a liquid crystal display (LCD) having a plurality of separately addressable liquid crystals. Alternatively, the display 1222 may comprise a light emitting diode (LED) display having clusters of red, green and blue diodes driven together to form full-color pixels. Each liquid crystal or pixel of the display 1222 changes to an opaque or translucent state to form a part of the image on the display in response to the data or information generated by the processor 1204 from the application of the instructions of the computer program 1210 and/or operating system 1208 to the input and commands. The image may be provided through a graphical user interface (GUI) module 1218. Although the GUI module 1218 is depicted as a separate module, the instructions performing the GUI functions can be resident or distributed in the operating system 1208, the computer program 1210, or implemented with special purpose memory and processors.

In one or more embodiments, the display 1222 is integrated with/into the computer 1202 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1202 according to the computer program 1210 instructions may be implemented in a special purpose processor 1204B. In this embodiment, some or all of the computer program 1210 instructions may be implemented via firmware instructions stored in a read only memory (ROM), a programmable read only memory (PROM) or flash memory within the special purpose processor 1204B or in memory 1206. The special purpose processor 1204B may also be hardwired through circuit design to perform some or all of the operations to implement the present invention. Further, the special purpose processor 1204B may be a hybrid processor, which includes dedicated circuitry for performing a subset of functions, and other circuits for performing more general functions such as responding to computer program 1210 instructions. In one embodiment, the special purpose processor 1204B is an application specific integrated circuit (ASIC).

The computer 1202 may also implement a compiler 1212 that allows an application or computer program 1210 written in a programming language such as C, C++, Assembly, SQL, PYTHON, PROLOG, MATLAB, RUBY, RAILS, HASKELL, or other language to be translated into processor 1204 readable code. Alternatively, the compiler 1212 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1210 accesses and manipulates data accepted from I/O devices and stored in the memory 1206 of the computer 1202 using the relationships and logic that were generated using the compiler 1212.

The computer 1202 also optionally comprises an external communication device such as a modem, satellite link, Ethernet card, or other device for accepting input from, and providing output to, other computers 1202.

In one embodiment, instructions implementing the operating system 1208, the computer program 1210, and the compiler 1212 are tangibly embodied in a non-transitory computer-readable medium, e.g., data storage device or content hub/repository 1220, which could include one or more fixed or removable data storage devices, such as a zip drive, floppy disc drive 1224, hard drive, CD-ROM drive, tape drive, etc. Further, the operating system 1208 and the computer program 1210 are comprised of computer program 1210 instructions which, when accessed, read and executed by the computer 1202, cause the computer 1202 to perform the steps necessary to implement and/or use the present invention or to load the program of instructions into a memory 1206, thus creating a special purpose data structure causing the computer 1202 to operate as a specially programmed computer executing the method steps described herein. Computer program 1210 and/or operating instructions may also be tangibly embodied in memory 1206 and/or data communications devices 1230, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1202.

Figure 13:
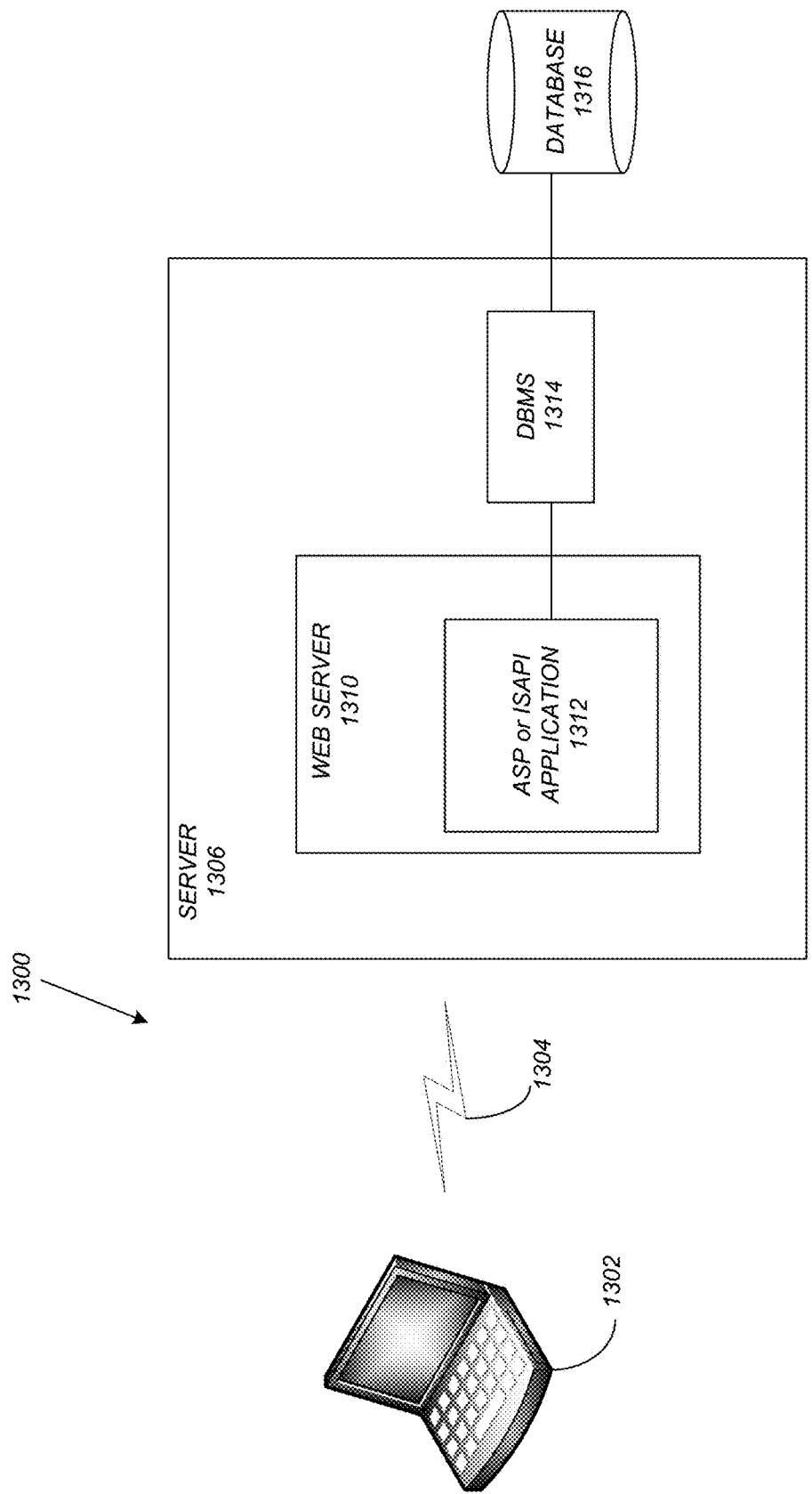
FIG. 13 schematically illustrates a typical distributed/cloud-based computer system using a network to connect client computers to server computers in accordance with one or more embodiments of the invention.

FIG. 13 schematically illustrates a typical distributed/cloud-based computer system 1300 using a network 1304 to connect client computers 1302 to server computers 1306. A typical combination of resources may include a network 1304 comprising the Internet, LANs (local area networks), WANs (wide area networks), SNA (systems network architecture) networks, or the like, clients 1302 that are personal computers or workstations (as set forth in FIG. 12), and servers 1306 that are personal computers, workstations, minicomputers, or mainframes (as set forth in FIG. 12). However, it may be noted that different networks such as a cellular network (e.g., GSM [global system for mobile communications] or otherwise), a satellite based network, or any other type of network may be used to connect clients 1302 and servers 1306 in accordance with embodiments of the invention.

A network 1304 such as the Internet connects clients 1302 to server computers 1306. Network 1304 may utilize ethernet, coaxial cable, wireless communications, radio frequency (RF), etc. to connect and provide the communication between clients 1302 and servers 1306. Further, in a cloud-based computing system, resources (e.g., storage, processors, applications, memory, infrastructure, etc.) in clients 1302 and server computers 1306 may be shared by clients 1302, server computers 1306, and users across one or more networks. Resources may be shared by multiple users and can be dynamically reallocated per demand. In this regard, cloud computing may be referred to as a model for enabling access to a shared pool of configurable computing resources.

Clients 1302 may execute a client application or web browser and communicate with server computers 1306 executing web servers 1310. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1302 may be downloaded from server computer 1306 to client computers 1302 and installed as a plug-in or ACTIVEX control of a web browser. Accordingly, clients 1302 may utilize ACTIVEX components/component object model (COM) or distributed COM (DCOM) components to provide a user interface on a display of client 1302. The web server 1310 is typically a program such as MICROSOFT'S INTERNET INFORMATION SERVER.

Web server 1310 may host an Active Server Page (ASP) or Internet Server Application Programming Interface (ISAPI) application 1312, which may be executing scripts. The scripts invoke objects that execute business logic (referred to as business objects). The business objects then manipulate data in database/content hub/repository 1316 through a database management system (DBMS) 1314. Alternatively, database/content hub/repository 1316 may be part of, or connected directly to, client 1302 instead of communicating/obtaining the information from database/content hub/repository 1316 across network 1304. When a developer encapsulates the business functionality into objects, the system may be referred to as a component object model (COM) system. Accordingly, the scripts executing on web server 1310 (and/or application 1312) invoke COM objects that implement the business logic. Further, server 1306 may utilize MICROSOFT'S TRANSACTION SERVER (MTS) to access required data stored in database/content hub/repository 1316 via an interface such as ADO (Active Data Objects), OLE DB (Object Linking and Embedding DataBase), or ODBC (Open DataBase Connectivity).

Generally, these components 1300-1316 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1302 and 1306 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1302 and 1306. Embodiments of the invention are implemented as a software/CAD application on a client 1302 or server computer 1306. Further, as described above, the client 1302 or server computer 1306 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for managing entities of a marketing domain model in a multi-state workflow, comprising:
(a) acquiring multiple entities of the marketing domain model in a content hub, wherein:
(i) each entity of the multiple entities comprises a set of data that belongs together as one;
(ii) each entity comprises one or more properties that describe entity details;
(iii) each entity comprises digital content used in the marketing domain model;
(iv) a search result for content in the content hub comprises one or more of the multiple entities;
(v) the multiple entities comprise different content types, with each different content type having a different set of the one or more properties;
(vi) at least one of the multiple entities comprises a product;
(b) creating relations between the multiple entities to give meaning to the marketing domain model;
(c) generating and displaying, in a graphical user interface, a displayed solution graph that represents all of the multiple entities and relations, wherein:
(i) each node of the displayed solution graph represents one of the multiple entities;
(ii) edges connecting the nodes in the displayed solution graph represent the relations;
(iii) the displayed solution graph is used to manage the digital content throughout a content lifecycle;
(iv) the displayed solution graph manages different state workflows for the multiple entities;
(v) the displayed solution graph manages intellectual property rights for the multiple entities; and
(vi) the displayed solution graph is for all of the multiple entities in the content hub for digital asset management (DAM), content marketing platform (CMP), marketing resource management (MRM), and product content management (PCM);
(d) navigating, and editing the displayed solution graph via the graphical user interface by:
(i) exposing the displayed solution graph to a marketing user that manages the digital content of the marketing user;
(ii) creating, via and inside the exposed displayed solution graph, a state workflow, of the different state workflows, for one or more of the nodes, wherein the state workflow comprises:
(1) one or more states, wherein different nodes have different types of states and different state workflows;
(2) one or more transitions between the one or more states;
(3) a waterfall-based workflow comprising one or more waterfall-based states, of the one or more states, wherein the waterfall-based states are linear and time duration based, and all of the waterfall-based states are either depended on or dependent on another waterfall-based state; and
(4) one or more non-linear state workflows orchestrated by the waterfall-based workflow;
(iii) managing the multiple entities using the state workflow and the graphical user interface as the multiple entities progress through the state workflow, wherein the managing:
(1) enables navigation using the nodes and the edges in the displayed solution graph to navigate between the one or more states, across the waterfall-based workflow and the one or more non-linear state workflows in any order;
(2) transitions the digital content, via user input from the marketing user into a state machine workflow area of the graphical user interface, from a first state of the one or more states to a next state of the one or more states, wherein:

(A) the transition is created by identifying the first state, selecting the next state, and storing the transition;

(B) the transition between the first state and the next state is depicted in a displayed state machine workflow graph of the graphical user interface, wherein in the displayed state machine workflow graph: a first state node represents the first state; a second state node represents the next state; an arrow connects the first state node and the second state node; and a descriptive label describes an event that triggers the transition; and (3) modifies, the multiple entities based on the displayed solution graph, wherein updates to the displayed solution graph are automatically applied to the multiple entities and the state workflows; and (e) driving a marketing campaign based on the displayed solution graph, wherein the marketing campaign delivers, based on the solution graph, the digital content of the marketing user to consumers.

2. The computer-implemented method of claim 1, wherein each of the relations comprises a direction and cardinality that steers knowledge inheritance.

3. The computer-implemented method of claim 1, further comprising:
querying the displayed solution graph in real time, wherein the edges of the displayed solution graph are used to reach a desired node as part of the query.

4. The computer-implemented method of claim 1, further comprising:
denormalizing the displayed solution graph; and
conducting a full-text semantic search on the denormalized displayed solution graph.

5. The computer-implemented method of claim 1, wherein:
permissions of the multiple entities are inherited over relations from a parent entity to a child entity.

6. The computer-implemented method of claim 1, further comprising:
generating a hypermedia application programming interface (API) that automatically adapts to changes in the displayed solution graph.

7. The computer-implemented method of claim 1, further comprising:
providing management and access to the multiple entities across multiple systems, wherein the multiple systems comprise a digital asset management (DAM) system, a content marketing platform (CMP) system, and a marketing resource management (MRM) system.

8. The computer-implemented method of claim 7, further comprising:
storing the entities and relations in a marketing production repository of the DAM, wherein the marketing production repository aggregates and stores product data, campaign data, user data, files, and file metadata used in daily marketing business; and
providing management and access to the marketing production repository via the displayed solution graph and state workflow for daily marketing business.

9. The computer-implemented method of claim 7, further comprising:
utilizing, within the CMP, the displayed solution graph and state workflow to plan, author, collaborate, curate, and distribute different entity types that drive execution of a content marketing strategy, and managing a campaign as part of the marketing strategy.

10. The computer-implemented method of claim 7, further comprising: within the MRM:
providing processes for the multiple entities including creating new entities, localizing the multiple entities, and reusing entities; and
enabling collaboration with respect to the multiple entities.

11. A computer-implemented system for managing entities of a marketing domain model in a multi-state workflow, comprising:
(a) a computer having a memory;
(b) a processor executing on the computer;
(c) the memory storing a set of instructions, wherein the set of instructions, when executed by the processor cause the processor to perform operations comprising:
(i) acquiring multiple entities of the marketing domain model in a content hub, wherein:
(A) each entity of the multiple entities comprises a set of data that belongs together as one;
(B) each entity comprises one or more properties that describe entity details;
(C) each entity comprises digital content used in the marketing domain model;
(D) a search result for content in the content hub comprises one or more of the multiple entities;
(E) the multiple entities comprise different content types, with each different content type having a different set of the one or more properties;
(F) at least one of the multiple entities comprises a product;
(ii) creating relations between the multiple entities to give meaning to the marketing domain model;
(iii) generating and displaying, in a graphical user interface, a displayed solution graph that represents all of the multiple entities and relations, wherein:
(A) each node of the displayed solution graph represents one of the multiple entities;
(B) edges connecting the nodes in the displayed solution graph represent the relations;
(C) the displayed solution graph is used to manage the digital content throughout a content lifecycle;
(D) the displayed solution graph manages different state workflows for the multiple entities;
(E) the displayed solution graph manages intellectual property rights for the multiple entities; and
(F) the displayed solution graph is for all of the multiple entities in the content hub for digital asset management (DAM), content marketing platform (CMP), marketing resource management (MRM), and product content management (PCM);
(iv) navigating and editing the displayed solution graph via the graphic user interface by:
(A) exposing the displayed solution graph, to a marketing user that manages the digital content of the marketing user;
(B) creating, via and inside the exposed displayed solution graph, a state workflow, of the different state workflows, for one or more of the nodes, wherein the state workflow comprises:
(1) one or more states, wherein different nodes have different types of states and different state workflows;
(2) one or more transitions between the one or more states;

(3) a waterfall-based workflow comprising one or more waterfall-based states, of the one or more states, wherein the waterfall-based states are linear and time duration based, and all of the waterfall-based states are either depended on or dependent on another waterfall-based state;
(4) one or more non-linear state workflows orchestrated by the waterfall-based workflow; and
(C) managing the multiple entities using the state workflow and the graphical user interface, as the multiple entities progress through the state workflow, wherein the managing:
(1) enables navigation using the nodes and the edges in the displayed solution graph to navigate between the one or more states, across the waterfall-based workflow and the one or more non-linear state workflows in any order;
(2) transitions the digital content, via user input from the marketing user into a state machine workflow area of the graphical user interface, from a first state of the one or more states to a next state of the one or more states, wherein:
(aa) the transition is created by identifying the first state, selecting the next state, and storing the transition; and
(bb) the transition between the first state and the next state is depicted in a displayed state machine workflow graph of the graphical user interface, wherein in the displayed state machine workflow graph: a first state node represents the first state; a second state node represents the next state; an arrow connects the first state node and the second state node; and a descriptive label describes an event that triggers the transition; and
(3) modifies, the multiple entities based on the displayed solution graph, wherein updates to the displayed solution graph are automatically applied to the multiple entities and the state workflows; and
(v) driving a marketing campaign based on the displayed solution graph, wherein the marketing campaign delivers, based on the displayed solution graph, the digital content of the marketing user to consumers.

12. The computer-implemented system of claim 11, wherein each of the relations comprises a direction and cardinality that steers knowledge inheritance.

13. The computer-implemented system of claim 11, wherein the operations further comprise:
querying the displayed solution graph in real time, wherein the edges of the displayed solution graph are used to reach a desired node as part of the query.

14. The computer-implemented system of claim 11, wherein the operations further comprise:
denormalizing the displayed solution graph; and
conducting a full-text semantic search on the denormalized displayed solution graph.

15. The computer-implemented system of claim 11, wherein:
permissions of the multiple entities are inherited over relations from a parent entity to a child entity.

16. The computer-implemented system of claim 11, wherein the operations further comprise:
generating a hypermedia application programming interface (API) that automatically adapts to changes in the displayed solution graph.

17. The computer-implemented system of claim 11, wherein the operations further comprise:
providing management and access to the multiple entities across multiple systems, wherein the multiple systems comprise a digital asset management (DAM) system, a content marketing platform (CMP) system, and a marketing resource management (MRM) system.

18. The computer-implemented system of claim 17, wherein the operations further comprise:
storing the entities and relations in a marketing production repository of the DAM, wherein the marketing production repository aggregates and stores product data, campaign data, user data, files, and file metadata used in daily marketing business; and
providing management and access to the marketing production repository via the displayed solution graph and state workflow for daily marketing business.

19. The computer-implemented system of claim 17, wherein the operations further comprise:
utilizing, within the CMP, the displayed solution graph and state workflow to plan, author, collaborate, curate, and distribute different entity types that drive execution of a content marketing strategy, and managing a campaign as part of the marketing strategy.

20. The computer-implemented system of claim 17, wherein the operations further comprise:
within the MRM:
providing processes for the multiple entities including creating new entities, localizing the multiple entities, and reusing entities; and
enabling collaboration with respect to the multiple entities.

* * * * *